(12) United States Patent
Ohta

(10) Patent No.: US 6,199,029 B1
(45) Date of Patent: Mar. 6, 2001

(54) TOPOGRAPHY SIMULATION METHOD AND SYSTEM OF PLASMA-ASSISTED ETCHING PROCESS

(75) Inventor: Toshiyuki Ohta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/084,579

(22) Filed: May 26, 1998

(30) Foreign Application Priority Data

May 26, 1997 (JP) .................................................. 9-134745

(51) Int. Cl.[7] .................................................. G06F 17/50
(52) U.S. Cl. .................................. 703/1; 703/2; 703/12; 204/298.01; 204/298.04
(58) Field of Search .................................. 703/1, 2, 6, 12; 204/298.01, 298.04

(56) References Cited

U.S. PATENT DOCUMENTS

| | | | |
|---|---|---|---|
| 5,416,729 | * 5/1995 | Leon et al. ................................. | 703/2 |
| 5,801,971 | * 9/1998 | Ohta ........................................ | 703/6 |
| 5,850,356 | * 12/1998 | Yamada et al. ........................... | 703/6 |

FOREIGN PATENT DOCUMENTS 9171994   6/1997   (JP)   ........................... H01L/21/3065

OTHER PUBLICATIONS

Dalvie et al., "Flux Considerations in the Coupling of Monte Carlo Plasma Sheath Simulations with Feature Evolution Models", IEEE Transactions on Electron Devices, vol. 39, Issue 5, pp. 1090–1099, May 1992.*

Tazawa et al., "A General Charactreization and Simulation Method for Deposition and Etching Tech.", IEEE Transactions on Semiconductor Manufacturing, vol. 5, Issue 1, pp. 27–33, Feb. 1992.*

(List continued on next page.)

Primary Examiner—Kevin J. Teska
Assistant Examiner—Douglas W. Sergent
(74) Attorney, Agent, or Firm—Hayes, Soloway, Hennessey, Grossman & Hage PC (57) ABSTRACT

A topography simulation method using the Monte Carlo method is provided, which simulates the post-etching topography of a plasma-assisted etching process affected by different etching species such as the ion-assisted etching process. (a) A bulk- and/or sheath-plasma region is/are analyzed using a first random number, calculating a species energy of an incoming species. (b) A sort of the incoming species toward a minute surface region of a target material is selected using a second random number based on the species energy calculated in the step (a). (c) An absorption state of the incoming species with atoms of the target material on the minute surface region of the target material is selected using a third random number based on the species energy in the step (a) and the sort of the incoming species selected in the step (b). (d) A chemical reaction of the incoming species with the atoms of the target material on the minute surface region of the target material is selected from a chemical-reaction data table using a fourth random number based on the absorption state of the incoming species selected in the step (c). The chemical-reaction data table has been calculated using the molecular dynamics in advance. (e) A topography of the minute surface region is calculated based on the chemical reaction selected in the step (d).

4 Claims, 5 Drawing Sheets

OTHER PUBLICATIONS

Kinoshita et al., "Structure Dependence of Notching: Simulation of Topography Dependent Charging with Sheath Oscillation Effect", 1st Inter. Symp. on Plasma Process–Induced Damage, pp. 47–50, May 1996.*

Jaszczak et al., "A Monte Carlo Simulation Method for {111} surfaces of silicon and other diamond–cubic Materials". Surface Science, vol. 374, Issue 1–3, pp. 319–332, Mar. 1997.*

Jonsson et al., "Controlled Topography Production: True 3D Simulation and Experiment", Vacuum, vol. 46, Issue 8/10, pp. 971–975, Aug. 1995.*

Scheckler et al., "Models and Algorithms for Three–Dimensional Topography Simulation with SAMPLE–3D", IEEE Transactions on Computer–Aided Design of IC and Sytems, vol. 13, Issue 2, pp. 219–230, Feb. 1994.*

"Simulation Approach for Achieving Configuration Independent Poly–Silicon Gate Etching" Harafuji et al IEDM Technical Digest; 1995 pp. 105–108.

Japan Journal of Applied Physics, vol. 62, No. 11, 1993, pp. 1111–1118.

* cited by examiner

TOPOGRAPHY SIMULATION METHOD AND SYSTEM OF PLASMA-ASSISTED ETCHING PROCESS

BACKGROUND OF THE INVENTION

1. Field of the Invention

The present invention relates to a process simulation method and system applicable to semiconductor device fabrication and more particularly, to a topography simulation method and system of a plasma-assisted etching process that employs the well-known Monte Carlo method.

2. Description of the Prior Art

In recent years, to implement higher-level integration of electronic elements on a semiconductor substrate, there has been the increasing need for better profile and dimension control in etching processes to form finer microstructures.

To form microstructures of semiconductor devices with the use of etching techniques, it is important to estimate or predict the post-etching topography of the microstructures through simulation from a standpoint of efficiency improvement in semiconductor device fabrication and development.

Conventionally, various topography simulation methods of etching processes have been popularly used in the semiconductor device fabrication field, which are based on the supposition that the etching process has an isotropy or perfect anisotropy. In these conventional topography simulation methods, however, it has become difficult to precisely represent the actual etching process because of the recent progress in microstructure formation or fabrication. Therefore, these conventional methods have become poor in usefulness.

Thus, there is the need for a novel, useful topography simulation method of etching processes.

On the other hand, analysis for plasma employed in plasma-assisted etching has been made in several ways and the plasma-analyzing techniques have been progressing. For example, a technique to analyze the electric potential distribution and the particle concentration in plasma using the fluid model or the Monte Carlo method have been developed and reported. These conventional plasma-analyzing techniques make it possible to simulate the plasma-assisted etching process and to predict the post-etching topography of the microstructures.

In one of the known calculation methods for simulating the etching topography using the analysis result of plasma, the surface state of minute regions of a target material to be etched is represented by using the type and rate of absorption species existing on the minute regions. In this calculation method, the absorption equilibrium equation, which relates to the chemical equilibrium between the absorption and desorption amounts of the species on the minute regions, is used. Also, in order to calculate the post-etching profile at the next time step, the surface state of the minute regions is renewed at each time step based on the calculation result, thereby changing the profile represented by the string elements and the string points of the "string model".

A conventional topography simulation method using the surface state of minute regions of a target material described above is disclosed in an article entitled "Simulation Approach for Achieving Configuration Independent Polysilicon Gate Etching", International Electron Devices Meeting (IEDM) Technical Digest, 1995, pp. 105–108, written by K. Harafuji et al., and an article entitled "Modeling and Simulation of Dry-etching", Japan Journal of Applied Physics, Vol. 62, No. 11, 1993, pp. 1111–1117.

In this conventional topography simulation method, the surface state of the minute regions of the target material is represented by the type and rate of the absorption species absorbed onto the minute regions of the target material.

First, the electric potential and particle concentration in a bulk-plasma region of a radio-frequency (RF) glow discharge are analyzed in a bulk-plasma analyzer section.

Second, the trajectory and energy of the incoming particles or species in a sheath-plasma (or, ion transfer) region of the glow discharge are analyzed in a sheath-plasma analyzer section. Using the resultant trajectory and energy of the incoming particles, the flux of the incoming particles is calculated.

Third, in a surface-reaction calculator section, the absorption equilibrium equation between the flux of the incoming particles and the absorbed species existing on the minute surface regions of the target material is solved. Thus, the time-dependent composition change of the absorbed species onto the minute surface regions of the target material, which is caused by the chemical reaction on the surface regions, is calculated.

The time-dependent composition change of the absorbed species thus calculated represents the surface state change of the minute surface regions of the target material.

To simulate the post-etching topography of the target material, it is supposed that the minute surface regions of the target material are etched by chemical reaction between the flux of the incoming particles and the absorbed species onto the minute surface regions of the target material according to the time-dependent composition change of the absorbed species.

Finally, in a topography calculator section, the post-etching topography of the target material is calculated using the time-dependent composition change of the absorbed species while the well-known string model is applied to the minute surface regions of the target material.

With the conventional topography simulation method using the surface state of minute regions of a target material disclosed in the above articles, however, there is a problem that a satisfactory calculation or simulation accuracy is not given. This is because the elemental processes or reactions on the minute surface regions of the target material are not identified and therefore, the simulation is not performed in the particle level. In other words, since the time-dependent composition change of the absorbed species on the minute surface regions of the target material is calculated by solving the absorption equilibrium equation between the absorption and the desorption amounts of the species, the chemical reactions between the individual species or particles are not sufficiently considered. These chemical reactions are replaced with the absorption equilibrium.

Moreover, the conventional topography simulation method disclosed in the above articles has another problem that a long calculation time is necessary. This is because the absorption equilibrium equation needs to be solved with respect to all types of the relating absorption species.

However, the actual chemical reactions will occur due to action of the specific absorption species and therefore, all types of the relating absorption species need not be considered for this purpose.

Additionally, the long-time use of computers increases not only the simulation cost but also the load on the computers. As a result, computer simulation is required to be finished in a time period as short as possible.

To cope with this requirement, the inventor created an improved topography simulation method and reported, which was filed as the Japanese Patent Application No. 7-328640 in 1995.

Figure 1:
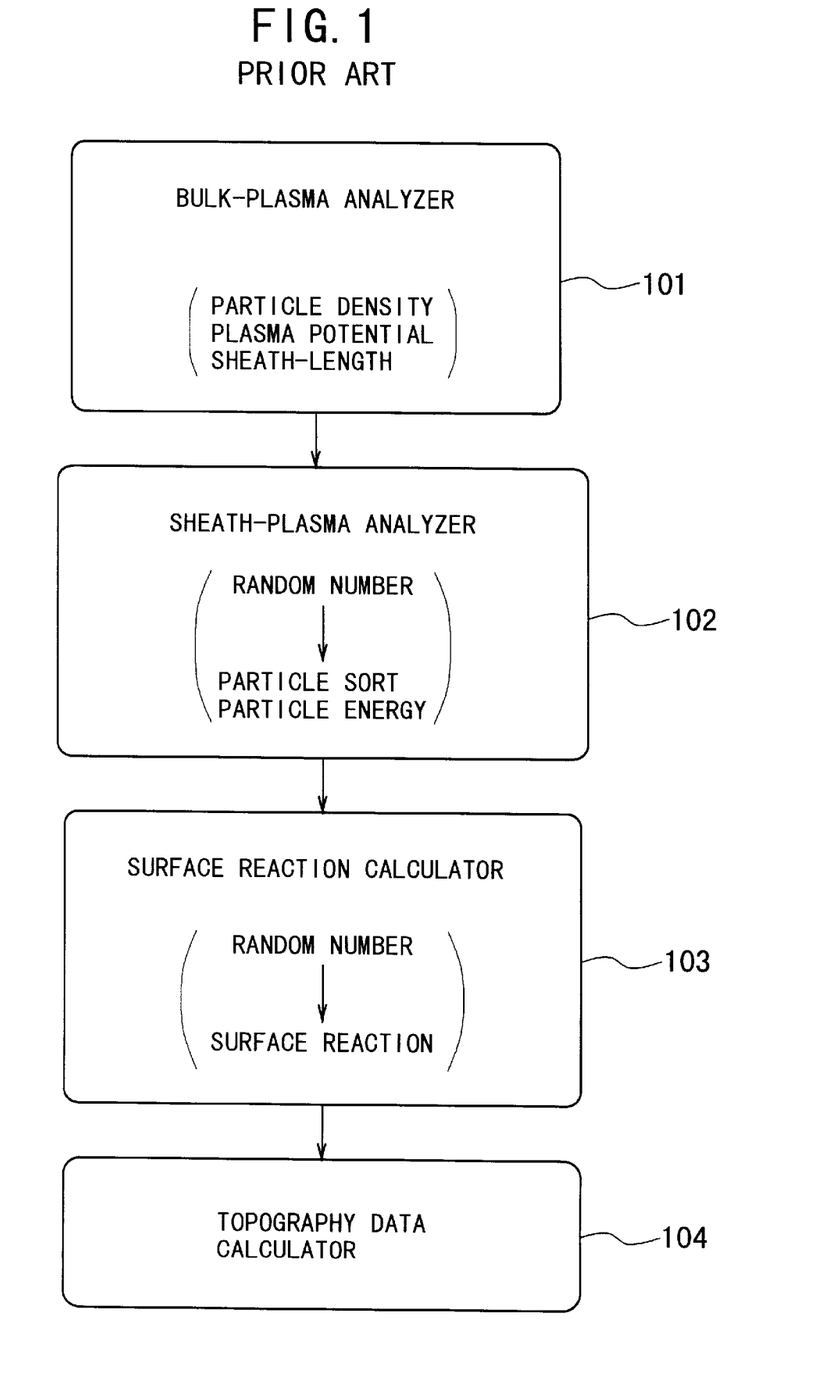
FIG. 1 is a schematic block diagram showing a conventional topography simulation method of a plasma-assisted etching process.

FIG. 1 schematically shows the improved topography simulation method disclosed in the Japanese Patent Application No. 7-328640.

As shown in FIG. 1, first, in a bulk-plasma analyzer 101, the plasma potential and particle density in a bulk plasma region of a radio-frequency (RF) glow discharge and the sheath length of a sheath plasma region thereof are calculated. The particle density is calculated for ions, electrons, and radicals. Thus, the time-dependent change of the plasma potential, the particle density, and the sheath length is derived.

Second, using the plasma potential and the particle density in the bulk plasma region and the sheath length thus calculated, the type of the incoming particles is selected, and the energy of the selected incoming particle is calculated in a sheath-plasma analyzer 102.

In this procedure, the type of the particles is selected by using a random number and a particle density table. The particle density table includes the particle density for the individual particles such as ions, electrons, and radicals, which is given in the bulk-plasma analyzer 101.

The initial velocity of the selected particle is calculated by using the Monte Carlo method based on the Maxwell distribution. Then, the trajectory of the selected particle is calculated by using the motion equation and the Poisson's equation, thereby deriving the energy of the selected particle.

Third, in a surface reaction calculator 103, the surface reaction occurring on the surface of the target material to be etched is selected in the following way.

The two-dimensional string model is applied to the etch front of the surface of the target material. A minute surface region between the two adjacent string points is selected. The selected particle is collided with this minute surface region.

The surface state of the minute surface region is represented by the type of the particle (i.e., absorption species) and the absorption rate of the particle. The absorption rate of the individual particles is listed in a surface state table.

The type of the absorption species, to which the selected particle in the sheath-plasma analyzer 102 is collided, is selected using the Monte Carlo method.

Next, according to the selected incoming particle and the selected absorption species, a reaction rate is calculated for various possible chemical reactions while considering the energy of the selected incoming particle. The chemical reaction that will occur on the minute surface region due to the selected incoming particle and the selected absorption species is selected using the Monte Carlo method.

Thus, the surface reaction on the minute surface region between the two adjacent string points is calculated. The minute surface region is etched due to the surface reaction, thereby shifting the string points to change the profile of the minute surface region.

The same calculation as the minute surface region is performed for all the string points.

Finally, in a topography data calculator 104, the topography data of the minute surface region is calculated according to the profile change of all the minute surface regions.

Thus, the post-etching topography of the etched surface of the target material is derived.

With the improved topography simulation method disclosed in the Japanese Patent Application No. 7-328640, the type of the incoming particle (i.e., the etching species) is identified or selected by using the Monte Carlo method without solving analytically the absorption equilibrium equation. Accordingly, there is an advantage that the sheath-plasma analysis can be achieved as a whole independent of the possibility or impossibility of analytic solution.

Also, the type and energy of the incoming particle or etching species, the type of the absorbed species to be collided with the incoming particle, and the elementary reaction or reactions that will be caused by the incoming particles and the absorbed species are determined in the respective procedures according to the Monte Carlo method. Thus, there is another advantage that high-speed calculation can be achieved.

As a result, the above-described topography simulation method disclosed in the Japanese Patent Application No. 7-328640 increases the calculation efficiency and analytical accuracy compared with the conventional topography simulation method disclosed in the previously-described articles.

However, the above-described topography simulation method disclosed in the Japanese Patent Application No. 7-328640 has the following disadvantage.

The method disclosed in the Japanese Patent Application No. 7-328640 is effective under the supposition that the absorbed species chemically reacted with the incoming particle is fixed onto the surface of the target material even after the reaction. In other words, no consideration is applied to the phenomenon that the absorbed species onto the surface of the target material will desorb from this surface due to chemical reaction or reactions. This phenomenon is typically caused by the incoming ion or ions during the "ion-assisted etching" process, in which the neighboring atom or atoms of the target material is/are desorbed from its surface due to bombardment with the incoming ion or ions.

Consequently, the topography simulation method disclosed in the Japanese Patent Application No. 7-328640 is unable to be applied to the topography simulation of etching processes of the type where a plurality of particles or atoms affect the etching process.

Additionally, the topography simulation method disclosed in the Japanese Patent Application No. 7-328640 has a possibility that the simulation or calculation accuracy becomes low according to the simulation condition and as a result, this method admits of improvement.

SUMMARY OF THE INVENTION

Accordingly, an object of the present invention is to provide a topography simulation method and system of a plasma-assisted etching process that is able to simulate the post-etching topography of a plasma-assisted etching process affected by different etching species such as the ion-assisted etching process.

Another object of the present invention is to provide a topography simulation method and system of a plasma-assisted etching process that has an improved simulation accuracy compared with the above-described conventional simulation method disclosed in the Japanese Patent Application No. 7-328640.

The above objects together with others not specifically mentioned will become clear to those skilled in the art from the following description.

A topography simulation method of a plasma-assisted etching process according to a first aspect of the present invention is comprised of the following steps (a) to (e):

(a) At least one of a bulk-plasma region of plasma and a sheath-plasma region of the plasma is analyzed using a first random number, thereby calculating a species energy of an incoming species toward a target material to be etched.

(b) A type or kind of the incoming species toward a minute surface region of the target material is selected using a second random number based on the species energy calculated in the step (a).

(c) An absorption state of the incoming species with atoms of the target material on the minute surface region of the target material is selected using a third random number based on the species energy calculated in the step (a) and the type of the incoming species selected in the step (b).

(d) A chemical reaction of the incoming species with the atoms of the target material on the minute surface region of the target material is selected from a chemical-reaction data table using a fourth random number based on the absorption state of the incoming species selected in the step (c).

The chemical-reaction data table includes a plurality of chemical-reaction data that have been calculated by using the molecular dynamics in advance.

(e) A topography of the minute surface region of the target material is calculated based on the chemical reaction selected in the step (d).

A topography of a surface of the target material is calculated by varying values of the first to fourth random numbers at each time step according to the Monte Carlo method.

With the topography simulation method according to the first aspect of the present invention, the absorption state of the incoming species with the atoms of the target material on the minute surface region of the target material is selected in the step (c) using the third random number based on the species energy calculated in the step (a) and the type of the incoming species selected in the step (b). Further, the chemical reaction of the incoming species with the atoms of the target material on the minute surface region of the target material, which corresponds to the selected absorption state in the step (c), is selected from the chemical-reaction data table in the step (d).

On the other hand, it has been known that the type and speed of the chemical reaction occurring on the surface of the target material vary widely according to the energy of the incoming species toward the target material. Therefore, it is preferred that the energy of the incoming species is specified in the step of selecting the type or kind of the species, and that the energy of the incoming species thus specified is reflected in the step of selecting the type or kind of the chemical reaction. Moreover, on actual calculation for the topography of the target material, it is preferred that the steps of selecting the type of the species and selecting the type of the chemical reaction are preformed with respect to each minute surface region of the target material.

On actual calculation for the topography of the target material, any proper simulation model such as the string model may be used as necessary.

In the simulation method according to the present invention, the above-described facts are fully considered. Specifically, the chemical reaction of each absorbed species with the incoming species on the surface of the target material is calculated in the previously-described simulation method disclosed in the Japanese Patent Application No. 7-328640. Unlike this, in the method of the present invention, the absorption state of the incoming species with the atoms of the target material on the minute surface region of the target material is selected, and then, the chemical reaction of the incoming species with the atoms of the target material is selected from the chemical-reaction data table.

Consequently, the post-etching topography of a plasma-assisted etching process affected by different etching species such as the ion-assisted etching process is able to be simulated.

Also, the simulation accuracy is improved compared with the above-described conventional simulation methods.

A topography simulation system of a plasma-assisted etching process according to a second aspect of the present invention is comprised of a plasma analyzer, an incoming species selector, an absorption state selector, a surface reaction selector, and a topography calculator.

The plasma analyzer analyzes at least one of a bulk-plasma region of plasma and a sheath-plasma region of the plasma using a first random number, thereby calculating a species energy of an incoming species toward a target material to be etched.

The incoming species selector selects a type or kind of the incoming species toward a minute surface region of the target material using a second random number based on the species energy calculated in the plasma analyzer.

The absorption state selector selects an absorption state of the incoming species with atoms of the target material on the minute surface region of the target material using a third random number based on the species energy calculated in the plasma analyzer and the type of the incoming species selected in the incoming species selector.

The surface reaction selector selects a chemical reaction of the incoming species with the atoms of the target material on the minute surface region of the target material from a chemical-reaction data table using a fourth random number based on the absorption state of the incoming species selected in the absorption state selector.

The chemical-reaction data table includes a plurality of chemical-reaction data that have been calculated by using the molecular dynamics in advance.

The topography calculator calculates a topography of the minute surface region of the target material based on the chemical reaction selected in the surface reaction selector.

A topography of a surface of the target material is calculated by varying values of the first to fourth random numbers at each time step according to the Monte Carlo method.

With the topography simulation system according to the second aspect of the present invention, there are the same advantages as those in the topography simulation method according to the first aspect of the present invention because of substantially the same reason as in the topography simulation method according to the first aspect.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Preferred embodiments of the present invention will be described in detail below while referring to the drawings attached.

Figure 5:
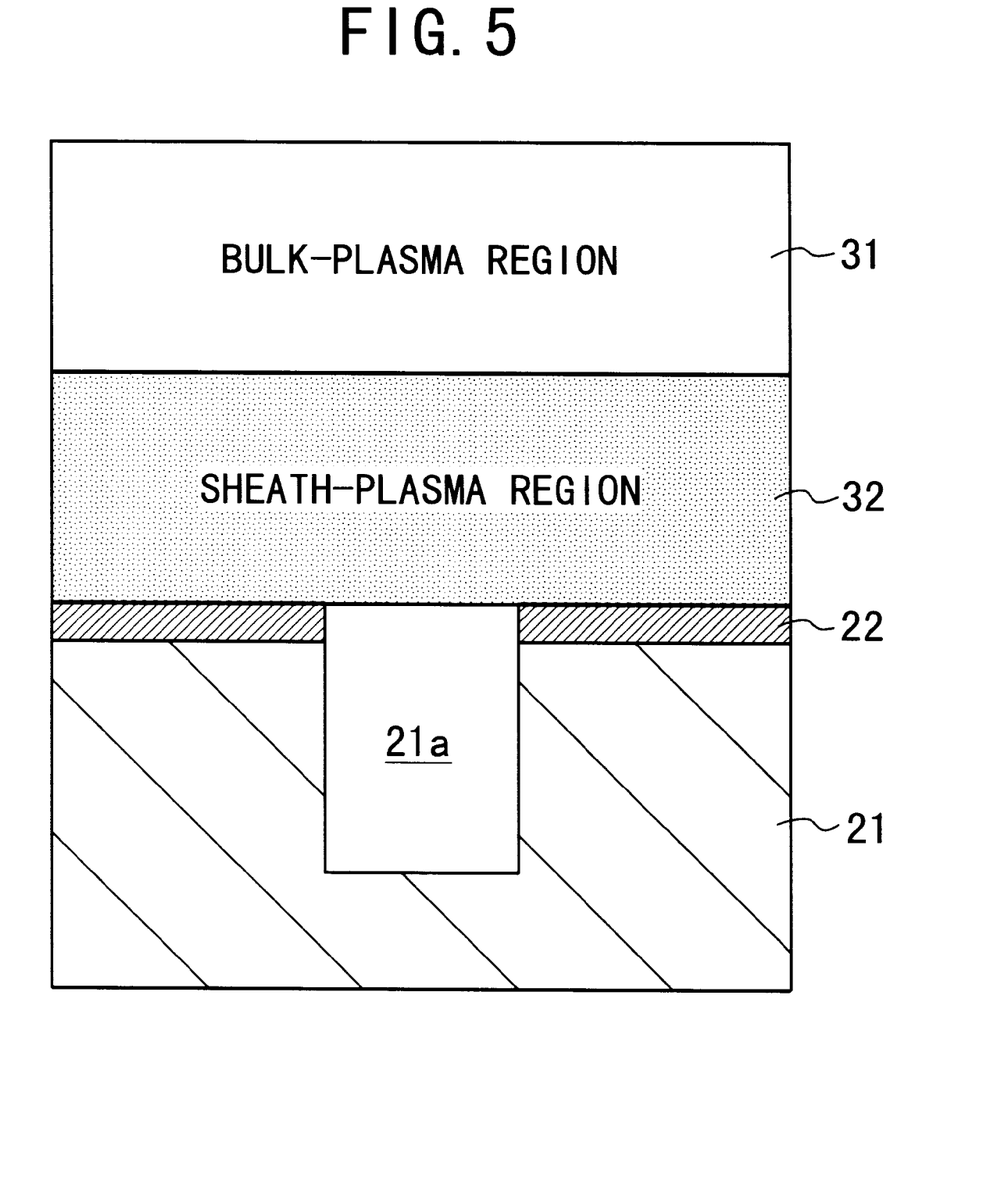
FIG. 5 is an enlarged, schematic, partial cross-sectional view of a target material with an etching mask on the surface, in which plasma is additionally illustrated over the surface of the target material.

As shown in FIG. 5, a target material 21 to be etched is placed in a vacuum chamber (not shown) of a plasma-assisted etching apparatus, in which a trench 21a is formed in the target material 21 and the surface of the material 21 is covered with a masking film 22 such as a patterned photoresist film. The trench 21a is formed by a plasma-assisted etching process.

Any semiconductor, metal, or dielectric may be typically used as the target material 21. The vacuum chamber is filled with a specific etching gas.

Here, it is supposed that the target material 21 is a single-crystal silicon substrate.

A plasma is generated in the vacuum chamber by generating an RF glow discharge between an anode and a cathode in the etching gas. A bulk-plasma region 31 of the plasma is located in the neighborhood of the surface of the target material 21. A sheath-plasma region 32 of the plasma is located between the bulk-plasma region 31 and the surface of the target material 21.

Figure 2:
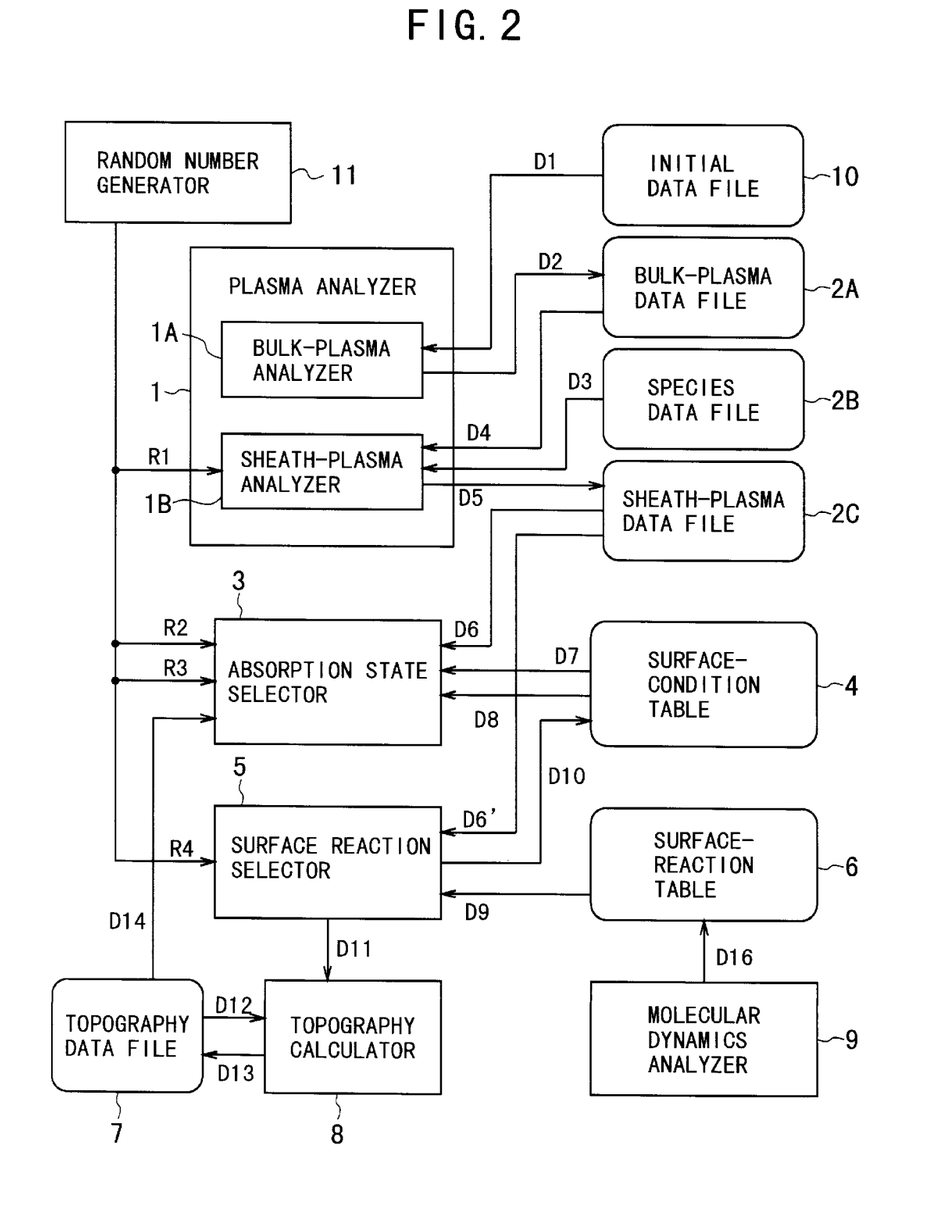
FIG. 2 is a schematic block diagram showing the configuration of a topography simulation system of a plasma-assisted etching process according to an embodiment of the present invention.

FIG. 2 shows a topography simulation system of a plasma-assisted etching process according to an embodiment of the present invention.

In FIG. 2, a plasma analyzer 1 includes a bulk-plasma analyzer section 1A and a sheath-plasma analyzer section 1B.

The bulk-plasma analyzer section 1A analyzes the state of the bulk-plasma region 31 of the plasma.

Specifically, the bulk-plasma analyzer section 1A reads out an initial data D1 from an initial data file 10. Examples of the contents of the initial data D1 are the initial boundary condition of the electric field, the initial RF bias voltage with an angular frequency $\omega$, the sort of an etching gas, and so on.

Using the initial data D1, the bulk-plasma analyzer section 1A solves simultaneously the continuity equation of charged particles (or, an electric current) and the Poisson's equation by the calculus of finite differences, thereby generating a data D2. The data D2 thus obtained is then written into a bulk-plasma data file 2A and stored therein.

The calculated data D2 indicates the plasma potential distribution, the particle density of etching particles such as ions, electrons, and radicals in the bulk-plasma region 31, and the time-dependent length change of the sheath-plasma region 32.

For example, if the time-dependent length of the sheath-plasma region 32 is defined as L, this length L is expressed by the following equation (1) as $$L = L_0 \sin \omega t + L_1 \qquad (1)$$

where $L_0$ is the amplitude of the length L and $L_1$ is the average value thereof.

The sheath-plasma analyzer section 1B reads out a first random number R1 from a random number generator 11. On the other hand, the analyzer 1B reads out a data D3 from a species data file 2B. The data D3 indicates a reaction probability (i.e., reaction constant) of the species or particles to be used for the etching process.

The analyzer section 1B selects or determines the type of the incoming species or particles to be used for the etching process by using the first random number R1 and the data D3 according to the Monte Carlo method. The selected particle corresponds to a particle generated at the interface between the bulk-plasma region 31 and the sheath-plasma region 32.

Here, it is supposed that the analyzer section 1B selects a radical of carbon trifluoride ($CF_3$).

Further, the sheath-plasma analyzer section 1B reads out a data D4 indicating the plasma potential distribution and the particle density of the etching particles in the bulk-plasma region 31 from the bulk-plasma data file 2A. Then, the sheath-plasma analyzer section 1B solves simultaneously the equation of motion and the Poisson's equation using the data D4. Thus, a data D5 indicating the type, energy, and trajectory of the selected particles is derived.

The data D5 thus derived in the sheath-plasma analyzer section 1B is written into a sheath-plasma data file 2C and stored therein.

The sheath-plasma analyzer section 1B performs the above-described procedure from the receipt of the first random number R1 to the storing of the data D5 repeatedly while varying the value of the first random number R1 at each time step according to the Monte Carlo method.

As a result, the data D5 indicating the energy and trajectory of the particles (i.e., etching species) for the individual types thus selected are stored in the sheath-plasma data file 2C.

An absorption state selector 3 selects the absorption state of a selected string element in the two-dimensional string model.

Figure 3:
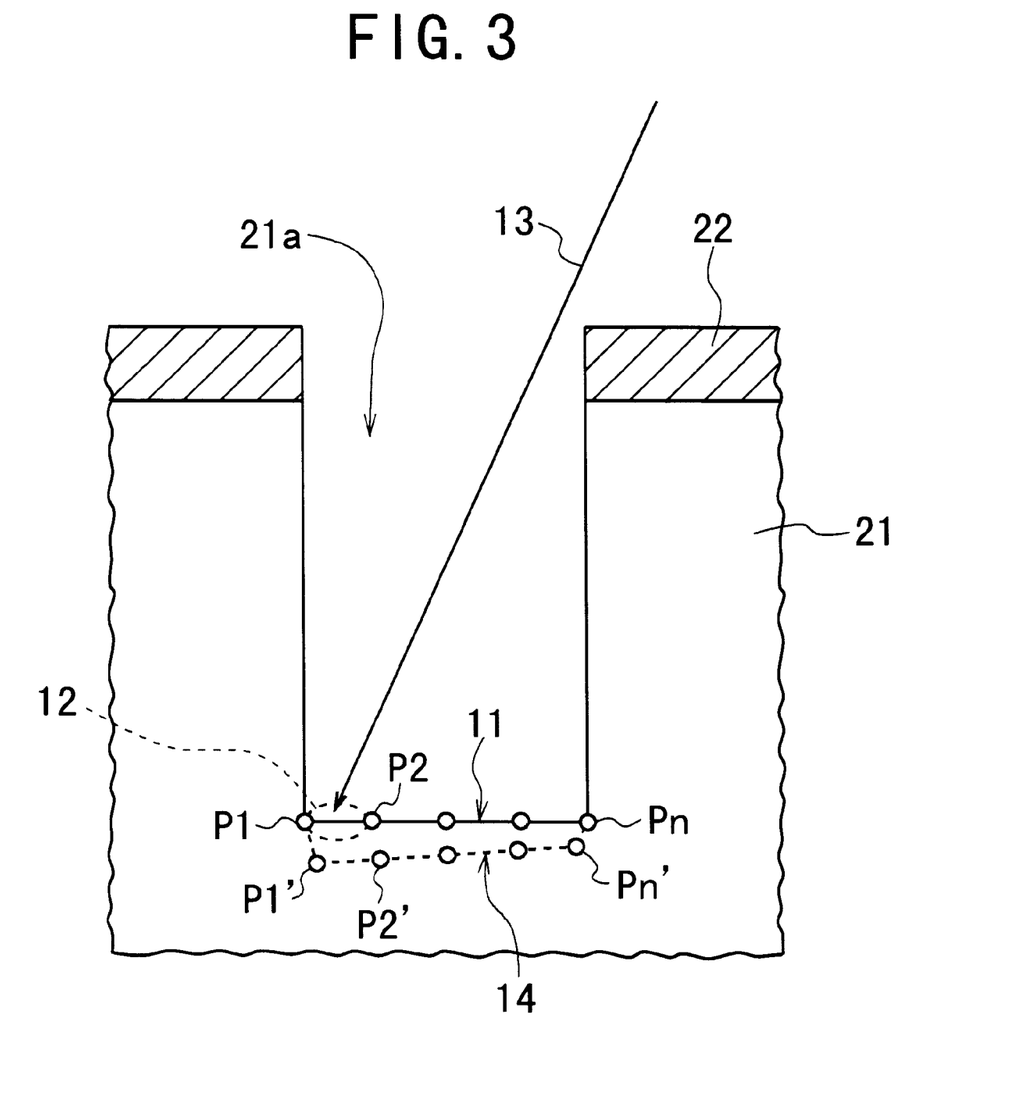
FIG. 3 is a schematic, partial cross-sectional view of a target material with an etching mask on the surface, in which a trajectory of an incoming etching species and the string elements and string points are shown.

Specifically, as shown in FIG. 3, the etch front (i.e., the bottom face of the trench 21a) of the target material 21 is approximated by the two-dimensional string model. The etch front of the target material 21 is represented by string points P1, P2, . . . , Pn and n string elements 11 located between any adjacent two ones of the string points P1, P2, . . . , Pn.

The reference numeral 13 in FIG. 3 denotes the trajectory of the incoming particle or etching species (i.e., $CF_3$ radical).

The absorption state selector 3 reads out a second random number R2 from the random number generator 11. Using the second random number R2 thus read out, the absorption state selector 3 selects one of the particle types, and the selector 3 reads out a data D6 from the sheath-plasma data file 2C. The data D6 indicates the trajectory 13 of the selected particle sort (i.e., $CF_3$).

On the other hand, the absorption state selector 3 reads out a data D14 at each time step from a topography data file 7. The data D14 indicates the profile of the etch front (i.e., the topography) of the target material 21.

Using the topography data D14 and the trajectory data D6 thus calculated or obtained, the absorption state selector 3 selects one of the string elements 11 between two adjacent ones of the string points P1 to Pn with which the incoming particle corresponding to the selected sort will collide. The selected string element is referred to the number 12 in FIG. 3.

Moreover, the absorption state selector 3 reads out a third random number R3 from the random number generator 11 and a data D7 from a surface-condition table 4. The data D7 indicates an absorption state k and an absorption rate (i.e., an absorption probability) $A^k$ of the absorption state k. The surface-condition table 4 includes a matrix $\{A^*\}$ of the absorption state k and the absorption probability $A^k$ for the individual particles serving as the etching species.

Using the third random number R3 and the absorption probability $A^k$ thus read out, the absorption state selector 3 selects one of the absorption states (i.e., the surface state) k according to the Monte Carlo method. The absorption states k thus selected indicates the surface state of the selected string element 12. The absorption state selector 3 reads out a data D8 indicating the structural formula corresponding to the absorption state k thus selected.

For example, the selected absorption state k is schematically expressed as the following structural formula (f-1).

(f-1)

As seen from this formula, the at least two atomic layers of Si.

A surface reaction selector 5 reads out a data D9 from a surface reaction table 6, and selects one of the surface reactions that will be caused by the case where the incoming particle selected in the sheath-plasma analyzer section 1B collides with the absorption state selected in the absorption state selector 3 using the data D9.

The surface reaction table 6 includes the data indicating the type (i.e., $CF_3$) of the individual incoming particles, the energy range of these incoming particles, the pre-reaction absorption state k, the post-reaction absorption state n, and the reaction rate or probability of the pre-reaction absorption state k. This table 6 is prepared prior to the start of a topography simulation method.

The post-reaction absorption state n thus selected is derived from the data D8 that indicates the structural formula corresponding to the selected absorption state k.

For example, the selected post-reaction absorption state n is schematically expressed as the following structural formula (f-2), in which one of the Si atoms absorbed to the $CF_3$ molecular radical is removed due to chemical reaction.

(f-2)

Specifically, the surface reaction selector 5 reads out a fourth random number R4 from the random number generator 11 and a data D6' indicating the selected type (i.e., $CF_3$) and energy of the incoming particle from the sheath-plasma data file 2C. Also, the surface reaction selector 5 reads out the data D9 indicating the type and energy range of the incoming particle (i.e., $CF_3$), the pre- and post-reaction absorption states k and n, and the reaction rate. The surface reaction selector 5 then compares the data D6' and D9 to thereby derive a conformable data value.

The surface reaction selector 5 selects one of the post-reaction absorption states n using the fourth random number R4 and the reaction rate contained in the data D9 according to the Monte Carlo method.

Further, the surface reaction selector 5 calculates the rates or probabilities $A^k$ and $A^n$ of the absorption states k and n using the following relationships (2) and (3), where $\Delta$ is the rate of change in the absorption states k and n.

$$A^k <= A^k - \Delta \quad (2)$$

$$A^n <= A^n + \Delta \quad (3)$$

The rates or probabilities $A^k$ and $A^n$ of the absorption states k and n thus calculated are written into the surface-condition table 4 to thereby renew the surface-condition data stored therein.

The procedures of the absorption state selector 3 and the surface reaction selector 5 are repeated until the wanted etching process is finished. Thus, a data D11 about the post-etching topography of the target material 21 is derived and then, stored in the topography data file 7 as a data D13.

Through the above-described steps, the string points P1 to Pn are shifted to the points P1' to Pn', respectively, resulting in the post-etching topography of the target material 21 is expressed by the string elements 14 between the shifted string points P1' to Pn'.

The topography data file 7 stores the initial and subsequent data of the string points P1, P2, . . . , Pn, and the string elements 11 of the two-dimensional string model.

A topography calculator 8 calculates the change of the surface geometry of the target material 21 in the following way.

The topography calculator 8 reads out a pre-reaction topography data D12 prior to the chemical reaction from the topography data file 7. On the other hand, the topography calculator 8 is applied with a geometry change data D11 indicating the geometry change due to the chemical reaction from the surface reaction selector 5. Then, using these two data D11 and D12, the topography calculator 8 calculates a post-reaction topography of the minute surface region of the target material 21 corresponding to the selected string element 12.

A data D13 indicating the post-reaction topography thus calculated is written into the topography data file 7 and stored therein.

Figure 4:
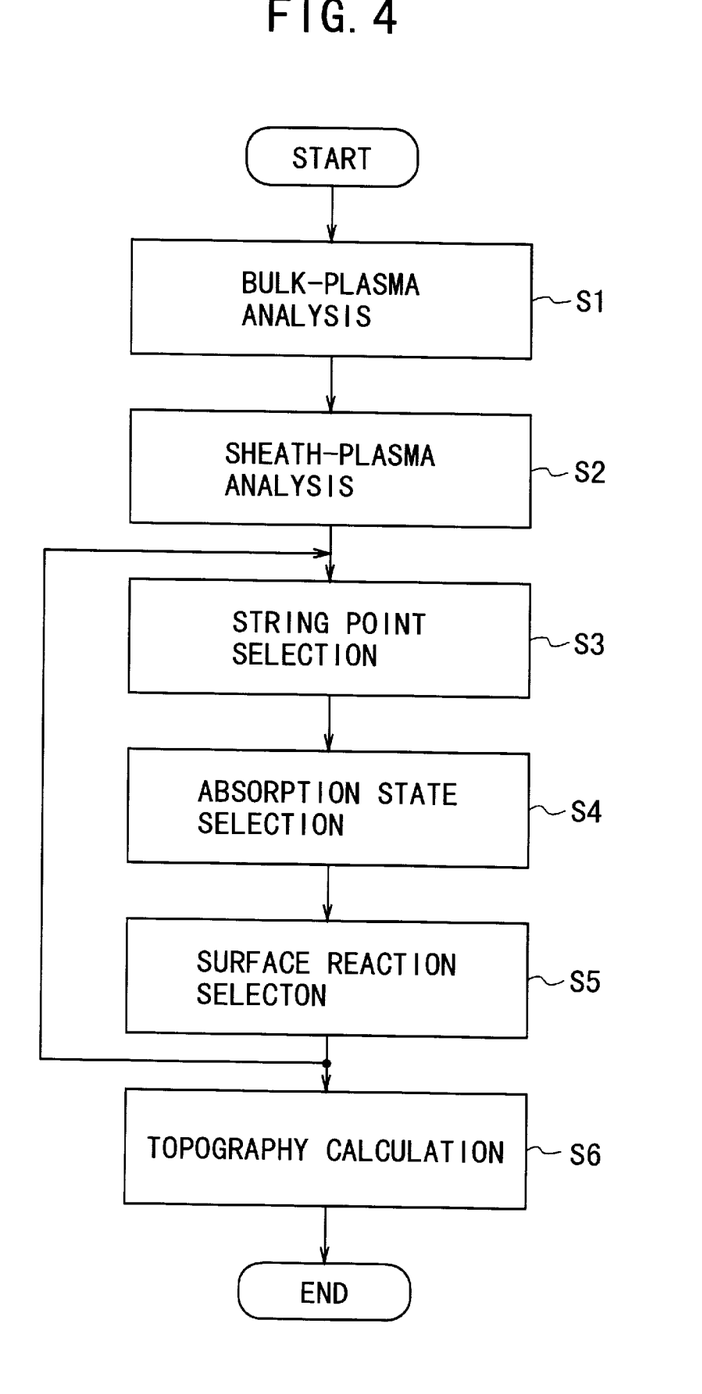
FIG. 4 is a flow chart showing a topography simulation method of a plasma-assisted etching process according to the embodiment shown in FIG. 2.

FIG. 4 shows a flow chart of the topography simulation method of a plasma-assisted etching process according to the embodiment of the present invention.

In the step S1, the state of the bulk-plasma region 31 of the plasma is analyzed by the bulk-plasma analyzer section 1A of the plasma analyzer 1. Thus, the data D2 indicating the plasma potential distribution, the particle density of the etching particles such as ions, electrons, and radicals in the bulk-plasma region 31, and the time-dependent length change of the sheath-plasma region 32 is derived and stored in the bulk-plasma data file 2A.

In the step S2, the state of the sheath-plasma region 32 of the plasma is analyzed by the sheath-plasma analyzer section 1B of the plasma analyzer 1 using the first random number R1, the data D3 from the species data file 2B, and the data D4 from the bulk-plasma data file 2A. Thus, the data D5 indicating the sort, energy, and trajectory of the selected particles is derived and stored in the sheath-plasma data file 2C.

In step S3, the type or kind of the incoming species (i.e., $CF_3$) toward the minute surface region of the target material 21 is selected by the absorption state selector 3 by the absorption state selector 3 using the second random number R2. Then, using the data D6 indicating the trajectory 13 of the selected particle type and the topography data D14, the string element 12 corresponding to the minute surface region of the target material 21 is selected.

In the step S4, the absorption or surface state of the incoming species on the minute surface region (i.e., the selected string element 12) of the target material 21 is selected using the third random number R3 and the data D7 indicating the absorption state k and its absorption rate or probability $A^k$ according to the Monte Carlo method.

Also, the data D8 that indicates the structural formula corresponding to the selected absorption state k is read out by the absorption state selector 3.

In the step S5, the chemical surface reaction of the selected incoming species (i.e., $CF_3$) with the atoms of the target material on the minute surface region (i.e., the selected string element 12) of the target material (i.e., Si) 21 is selected by the surface reaction selector 5 using the fourth random number R4.

The above procedure of the absorption state selector 3 and the surface reaction selector 5 in the steps S3 to S5 are repeated until the desired etching process is finished. Thus, the data D11 about the post-etching topography of the target material 21 is derived from the surface reaction selector 5 and then, stored in the topography data file 7 as the data D13.

In the step S6, the post-etched topography of the target material 21 is calculated by the topography calculator 8.

Through the above-described steps S1 to S6, the string points P1 to Pn are shifted to the points P1' to Pn', respectively, as shown in FIG. 3. The post-etching topography of the target material 21 is expressed by the string elements 14 between the shifted string points P1' to Pn'.

With the simulation method according to the embodiment of the present invention, the absorption state for the selected incoming species (i.e., $CF_3$) and the atoms (i.e., Si) of the minute surface region of the target material 21 is selected using the prepared data files 10, 2A, 2B, and 2C and the data table 4, and then, the chemical reaction of the selected incoming species with the atoms of the target material 21 is selected from the surface-reaction table 6 that has been prepared in advance using the Molecular Dynamics (MD) method.

In other words, the surface reaction between the selected incoming species and the atoms of the target material 21 included in the selected minute surface region (i.e., the selected string element 12) is used.

Consequently, the post-etching topography of a plasma-assisted etching process affected by different types of etching species such as the ion-assisted etching process is able to be simulated.

Also, the simulation accuracy is improved compared with the above-described conventional simulation method disclosed in the Japanese Patent Application No. 7-328640.

The surface-reaction table 6, which needs to be prepared prior to the start of the topography simulation method, is prepared in the following way.

The trajectory of the atoms (i.e., Si atoms) of the target material 21 (i.e., Si substrate) at the time when the selected species (i.e., $CF_3$ radical) travels to the minute surface region of the target material 21 in the selected absorption state is calculated using the Molecular Dynamics (MD) method in a molecular dynamics analyzer 9.

In this case, while the rotational and translatory movements of the atoms (i.e., Si) are taken into account, the interatomic potential is calculated by using the experimental potentials such as the Morse potential, and the numerical analysis is performed by using the Velocity Varlet method.

The calculation result thus obtained is accumulated to thereby derive the reaction rate of the atoms (i.e., Si). The reaction rate data is stored in the surface reaction table 6.

To confirm the advantage of the present invention, the inventor conducted a test. As a result, the simulation accuracy was improved by 30% compared with the above-described conventional simulation method disclosed in the Japanese Patent Application No. 7-328640. This is because the surface-reaction table 6 is used.

Usually, the use of the Molecular Dynamics method increases the calculation time period. Especially, when the topography simulation method is performed using the Monte Carlo method while calculating the surface reactions using the Molecular Dynamics method, the necessary calculation time period will be drastically prolonged.

Unlike this, the surface-reaction table 6 has already been prepared prior to the start of the topography simulation method in the present invention. Therefore, the increase of the necessary calculation time period was limited to be an approximately 10% increment of the above-described conventional simulation method disclosed in the Japanese Patent Application No. 7-328640.

Thus, it was confirmed that the present invention was capable of simulation at a higher accuracy without increasing the calculation time period compared with this conventional simulation method.

While the preferred form of the present invention has been described, it is to be understood that modifications will be apparent to those skilled in the art without departing from the spirit of the invention. The scope of the invention, therefore, is to be determined solely by the following claims.

What is claimed is:

1. A topography simulation method of a plasma-assisted etching process, said method comprising the steps of:

(a) a first step of analyzing at least one of a bulk-plasma region of plasma and a sheath-plasma region of said plasma using a first random number, and calculating a species energy of an incoming species toward a target material to be etched;

(b) a second step of selecting a type of said incoming species toward a minute surface region of said target material using a second random number based on said species energy calculated in said step (a);

(c) a third step of selecting an absorption state of said incoming species with atoms of said target material on said minute surface region of said target material using a third random number based on said species energy calculated in said step (a) and said type of said incoming species selected in said step (b);

(d) a fourth step of selecting a chemical reaction of said incoming species with said atoms of said target material on said minute surface region of said target material from a chemical-reaction data table using a fourth random number based on said absorption state of said incoming species selected in said step (c);

said chemical-reaction data table including a plurality of chemical-reaction data that have been calculated by using said molecular dynamics in advance;

(e) a fifth step of calculating a topography data of said minute surface region of said target material based on said chemical reaction selected in said step (d) and storing said data in a topography data file; and (f) a sixth step of calculating a topography of a surface of said target material, using data from said topography data file, by varying values of said first to fourth random numbers at each time step by the use of the Monte Carlo method.

2. A method as claimed in claim 1, wherein each of said step (b) of selecting a type of said incoming species, said step (c) of selecting an absorption state of said incoming species, and said step (d) of selecting a chemical reaction of said incoming species is performed searching a data file.

3. A topography simulation device for use in control of a plasma-assisted etching process, said system comprising:

(a) a plasma analyzer for analyzing at least one of a bulk-plasma region of plasma and a sheath-plasma region of said plasma using a first random number, for calculating a species energy of an incoming species toward a target material to be etched;

(b) an incoming species selector for selecting a type or kind of said incoming species toward a minute surface region of said target material using a second random number based on said species energy calculated in said plasma analyzer;

(c) an absorption state selector for selecting an absorption state of said incoming species with atoms of said target material on said minute surface region of said target material using a third random number based on said species energy calculated in said plasma analyzer and said type of said incoming species selected in said incoming species selector;

(d) a surface reaction selector for selecting a chemical reaction of said incoming species with said atoms of said target material on said minute surface region of said target material from a chemical-reaction data table using a fourth random number based on said absorption state of said incoming species selected in said absorption state selector;

said chemical-reaction data table including a plurality of chemical-reaction data that have been calculated by using said molecular dynamics in advance;

(e) a topography calculator for calculating a topography data of said minute surface region of said target material based on said chemical reaction selected in said surface reaction selector; and (f) a topography data file for storing topography data from said topography calculator, wherein a topography of a surface of said target material is calculated, using data from said topography data file, by varying values of said first to fourth random numbers at each time step by the use of the Monte Carlo method.

4. A device as claimed in claim 3, wherein said incoming species selector, said absorption state selector, and said chemical reaction selector make their respective selections by searching a data file.

* * * * *